Oct. 29, 1929.　　E. W. ACKERMAN ET AL　　1,733,851
REBOUND DEVICE PISTON
Filed Dec. 13, 1926
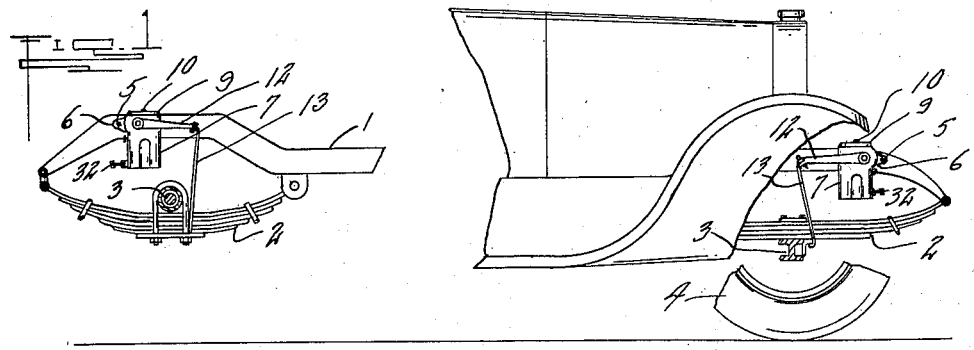
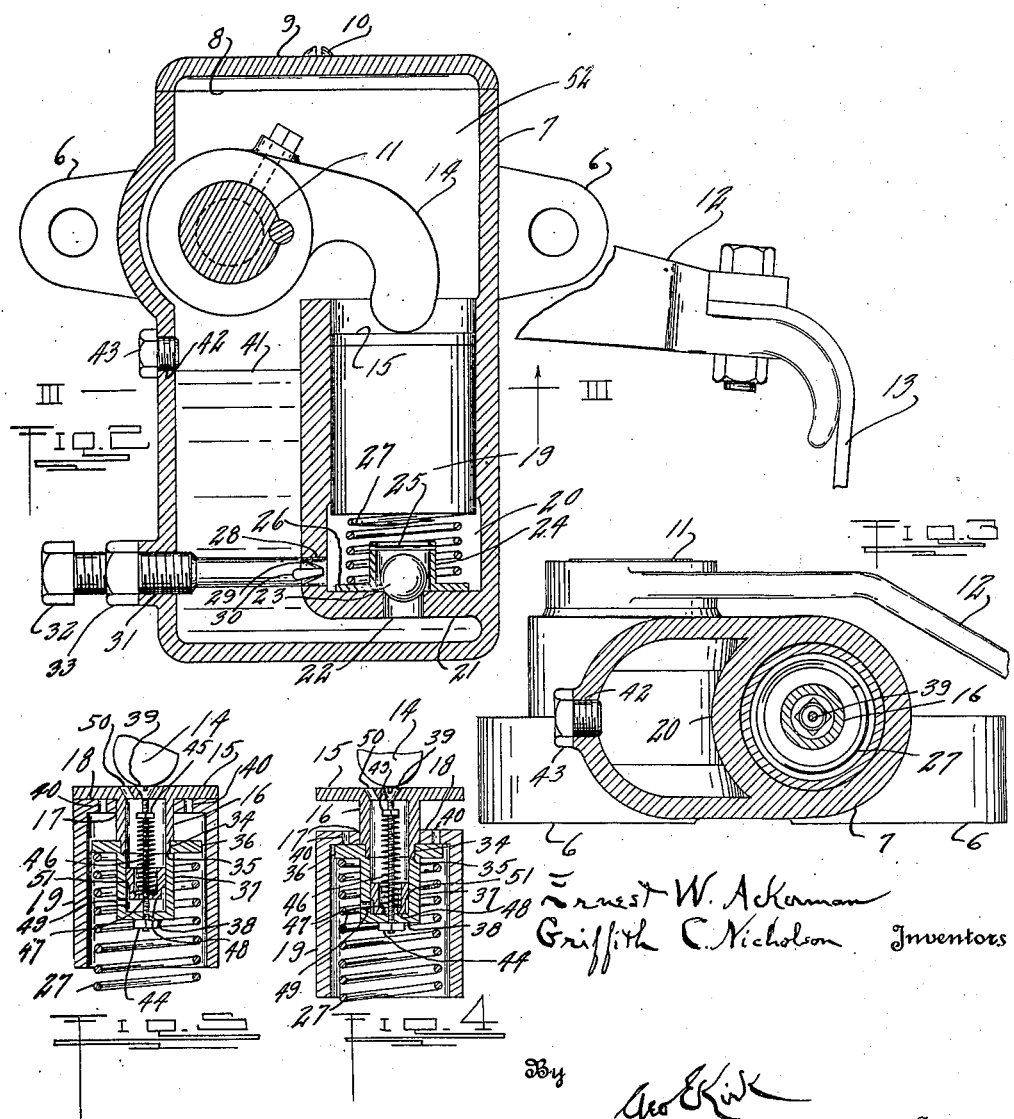

Patented Oct. 29, 1929

1,733,851

UNITED STATES PATENT OFFICE

ERNEST W. ACKERMAN AND GRIFFITH C. NICHOLSON, OF MONROE, MICHIGAN, ASSIGNORS TO HYDRO-CHECK CORPORATION, OF MONROE, MICHIGAN, A CORPORATION OF MICHIGAN

REBOUND DEVICE PISTON

Application filed December 13, 1926. Serial No. 154,429.

This invention relates to freedom or a reduced resistance range in dash-pot devices.

This invention has utility when incorporated in rebound absorbers or shock take up devices for motor vehicles in providing a freedom for vehicle body movement relatively to the axles before the more resistant taking hold of a hydraulic resistance.

Referring to the drawings:

Fig. 1 is a side elevation, with parts broken away, of an embodiment of the invention in a motor vehicle;

Fig. 2 is an enlarged view, in section, of the device of the invention in Fig. 1;

Fig. 3 is a section on the line III—III Fig. 2 looking in the direction of the arrow;

Fig. 4 is an enlarged detail view, in section, of the piston showing its double or ported head control as in one position of port closure wherein the spring is predominant; and Fig. 5 is a view similar to Fig. 4 with the piston device structure in position wherein the piston operating means is predominant over the spring.

Motor vehicle body frame 1 is shown as carried by springs 2 for relative movement as to axles 3 having wheels 4. Bolts 5 through ears 6 anchor housing 7 in fixed relation with the vehicle frame 1. This housing 7 is provided with top opening 8 closed by top 9 as anchored therewith by bolts 10. Through this housing 8 extends rock shaft 11 having fixed thereon arm 12 from which depends flexible extension 13 to fixed connection with an axle 3. Accordingly, in the relative movement of the axle 3 as to the frame 1 there is a rocking of the shaft 11 as to the housing 7.

This shaft 11 has fixed therewith piston operating means or arm 14 coacting with flange 15 fixed with tubular section 16 extending through central opening 17 in head 18 of piston having depending skirt 19 operable in cylinder 20. This cylinder 20 has head 21 with central port 22 therein as an intake valve normally closed by ball 23. Cage 24 with pin 25 keeps the ball 23 in position adjacent the port 22. This cage 24 has flange 26 engaged by compression helical spring 27 maintaining this cage 24 in position about the port 22.

The cylinder 20 adjacent the head 21 has lateral port 28 in which is tapered stem 29 having flattened seepage portion 30. This stem 29 may be adjusted to regulate the seepage from the cylinder 20 by threaded portion 31 having head 32 for effecting rotation as to the housing 7. At the desired adjusted seepage position for the stem 29, nut 33 may be operated into locking position between the housing 7 and the threaded portion 31.

The tubular portion 16 has reduced extension 34 engaged in seat 35 of flange 36 having second tubular section 37 with integral closure 38 remote from the flange 36. Bolt 39 may assemble these tubular sections 16, 37, as a tubular member unit with the pair of flanges 15, 36, upon opposite sides of the piston head 18 as a double head for this piston effective in the respective positions of these flanges 15, 36, against the head 18 for closing ports 40 through said head 18.

The spring 27 from the intake valve cage flange 26 tends normally to hold the flange 36 against the piston head 18 and thus holds the ports 40 closed with the flange 15 having clearance as to the head 18 and against the operating means arm 14. As a load is applied or a concussion transmitted to overcome the action of the spring 27, the floating piston 18, 19, has its movement resisted by liquid 41 as an incompressible medium in the cylinder 20. This medium 41 is charged into the housing 7 to opening 42 closed by plug 43. The piston 18, 19, thus is held during the initial descent of the flange 15 as actuated by the arm 14. Accordingly, the ports 40 are opened and there may be some flow of the liquid 41 out from the skirted piston 18, 19, before the flange 15 comes into port closed position at the ports 40 thereby to trap the incompressible medium in the skirted piston. From such relatively less resistance travel region or freedom of the open ports 40, there follows a much greater resistance as supplementing the spring 27 by the incompressible medium 41. This further descent rate is governed by the seepage adjustment of the stem 29, for the check valve 23 is closed.

As this incompressible medium pressure builds up, disastrous concussion upon the housing 7 is avoided herein by incorporating a relief valve with this relatively freer movement range unit.

To this end the bolt 39 has nut 44 thereon assembling the tubular sections 16, 37. Adjusting nut 45 permits regulation of the compression helical spring 46 acting upon inwardly extending flange 47 of plunger 48 to hold such plunger against closed end 38 of the tubular member 36, 37, 38, and thus isolate lateral port 49 in the member 37 from port 50 in the flange member 15. This plunger 48 has shoulder 51 exposed at all times to pressure as developed in the skirted piston 18, 19, so that as such pressure builds up on the shoulder 51 to overcome the adjusted resistance of the spring 46 this plunger 48 may be unseated from the end portion 38 to allow flow of the medium 41 through the port 49 and above the inwardly extending flange 47 through this plunger 48 and the tubular members 37, 16, to be discharged at the port 50 above the piston into air chamber 52, there to flow back into the medium 41 outside the cylinder 20. At once the operating action of the arm 41 is reduced below the holding action of the spring 46 this plunger 48 is reseated and the relief valve thus closed.

The device may have the seepage thereafter continue at the stem 28, or if there be reverse movement the spring 27, may cause the piston to rise with the resultant unseating of the intake check valve ball 23 and the ports 40 closed by the flange 36.

There is accordingly provided herein a relief valve unit incorporated with a relatively free center in a device which permits, by a simple mechanism, a freedom for shock absorber action with the positive holding of a hydraulic resistance as wider movement range causes the pressure to build up.

What is claimed and it is desired to secure by Letters Patent is:

1. A piston and cylinder device including a cylinder, a double headed piston therein, a spring for acting on one head, and piston operating means for positively acting upon the other head and thereby shifting the one head as to the piston in overcoming the spring and thereafter shifting said piston whereby differential resistance to piston operation is provided.

2. A piston and cylinder device including a cylinder, a piston therefor having a relatively shiftable double head, a spring for acting on one head, and piston operating means for positively acting upon the other head and thereby shifting the one head as to the piston in overcoming the spring and thereafter shifting said piston and heads whereby differential resistance to piston operation is provided.

3. A piston and cylinder device including a cylinder, a piston therefor having a port and a relatively shiftable head, a spring normally holding the head in piston port closed position, and piston operating means for acting against the resistance of said spring for effecting relative movement between the piston and head for opening said port.

4. A piston and cylinder device including a cylinder, a piston therefor having a port and a relatively shiftable head having two means for closing said port, a spring normally holding the head in piston port closed position in one direction, and piston operating means for acting against the resistance of the spring for effecting relative movement of the piston from said spring held port closed position and thereafter shifting the piston and head whereby the head shifting relatively to the piston provides one resistance to the operating means and the piston and head movement together provides an additional resistance to the operating means.

5. A dash-pot device having a piston, a spring providing a spring resistance range, an additional hydraulic resistance range, and means rendering a portion of the spring resistance range free from hydraulic cooperation and imposing hydraulic cooperation upon the remaining portion.

6. A dash-pot device having a piston, a spring providing a spring resistance range, an additional hydraulic resistance range, valve means rendering a portion of the spring resistance range free from hydraulic cooperation and imposing hydraulic cooperation upon the remaining portion, and a relief valve for the hydraulic cooperation range.

7. A dash-pot device having a piston with a guide opening therethrough and a port adjacent said opening, a first tubular section having a flange for closing said port on one side, a second tubular section having a spring which closes said port on the other side, a bolt for assembling said sections into a tubular member, each of said sections having a port, a spring on the bolt, and a plunger urged by the spring to cut off communication between said ports.

8. A dash-pot device embodying a piston, a spring providing a spring resistance range therefor, a hydraulic resistance, and a by-pass for the hydraulic resistance carried by said piston operable for a portion of the spring resistance range.

9. A piston and cylinder device including a cylinder for a liquid, a piston therefor having a head and a skirt rigid therewith and depending therefrom, there being a port through said head, there being ledge means within said skirt to provide a compressible medium chamber adjacent the under side of said head, and a compression spring in the cylinder acting on said ledge.

In witness whereof we affix our signatures.

ERNEST W. ACKERMAN.
GRIFFITH C. NICHOLSON.

CERTIFICATE OF CORRECTION.

Patent No. 1,733,851.  Granted October 29, 1929, to

ERNEST W. ACKERMAN ET AL.

It is hereby certified that error appears in the printed specification of the above numbered patent requiring correction as follows: Page 2, line 96, claim 6, strike out the word "valve"; and that the said Letters Patent should be read with this correction therein that the same may conform to the record of the case in the Patent Office.

Signed and sealed this 3rd day of December, A. D. 1929.

(Seal)

M. J. Moore,
Acting Commissioner of Patents.